(12) United States Patent
Rosenbaum

(10) Patent No.: US 6,629,804 B1
(45) Date of Patent: Oct. 7, 2003

(54) NUT CUTTER

(76) Inventor: Kevin W. Rosenbaum, 23 Oak Rd., Rocky River, OH (US) 44116

(*) Notice: Subject to any disclaimer, the term of this patent is extended or adjusted under 35 U.S.C. 154(b) by 148 days.

(21) Appl. No.: 09/941,800

(22) Filed: Aug. 29, 2001

Related U.S. Application Data

(60) Provisional application No. 60/229,969, filed on Sep. 1, 2000.

(51) Int. Cl.[7] .............................................. B23B 51/00
(52) U.S. Cl. ........................ 408/67; 408/97; 408/112; 408/713
(58) Field of Search .............................. 30/272.1, 360; 29/426.4; 408/67, 127, 141, 79, 80, 84, 97, 110, 112, 201, 231, 713, 203.5, 204, 207, 214, 124; 279/143, 144, 145

(56) References Cited

U.S. PATENT DOCUMENTS

| | | | | |
|---|---|---|---|---|
| 2,266,393 A | * | 12/1941 | Hoffman | 30/358 |
| 2,298,975 A | * | 10/1942 | Shelburne | 408/204 |
| 3,583,821 A | * | 6/1971 | Shaub et al. | 408/72 R |
| 3,620,635 A | * | 11/1971 | DalBianco et al. | 408/84 |
| 3,640,635 A | * | 2/1972 | Von Hollen | 408/101 |
| 3,970,407 A | * | 7/1976 | Uffman | 408/204 |
| 4,083,111 A | | 4/1978 | Kerins | |
| 4,188,722 A | | 2/1980 | Young | |
| 4,203,211 A | | 5/1980 | Quick | |
| 4,365,413 A | | 12/1982 | Quick | |
| 4,375,341 A | * | 3/1983 | Schulze | 408/72 R |
| 4,572,035 A | | 2/1986 | Eisenhauer | |
| 4,682,399 A | * | 7/1987 | Heimbach | 29/426.4 |
| 4,940,370 A | * | 7/1990 | Gipson | 408/72 R |
| 5,743,682 A | * | 4/1998 | Chaney, Sr. | 408/79 |

FOREIGN PATENT DOCUMENTS

| | | | | |
|---|---|---|---|---|
| DE | 2404504 | * | 8/1975 | 408/67 |
| FR | 2441455 | * | 7/1980 | 408/67 |

* cited by examiner

*Primary Examiner*—Daniel W. Howell
(74) *Attorney, Agent, or Firm*—Renner, Otto, Boisselle & Sklar, LLP

(57) ABSTRACT

A nut cutter tool includes a cutter head rotatably driven by a driver. The cutter head may be detachable from the driver for sharpening or replacement of the cutter head. A chip guard may be attached to the tool for catching falling chips and debris. Also a locking mechanism may be provided for releasably locking the tool onto an externally threaded member on which the nut to be cut is threaded to hold the tool in axial alignment with the nut during the nut cutting operation.

37 Claims, 18 Drawing Sheets

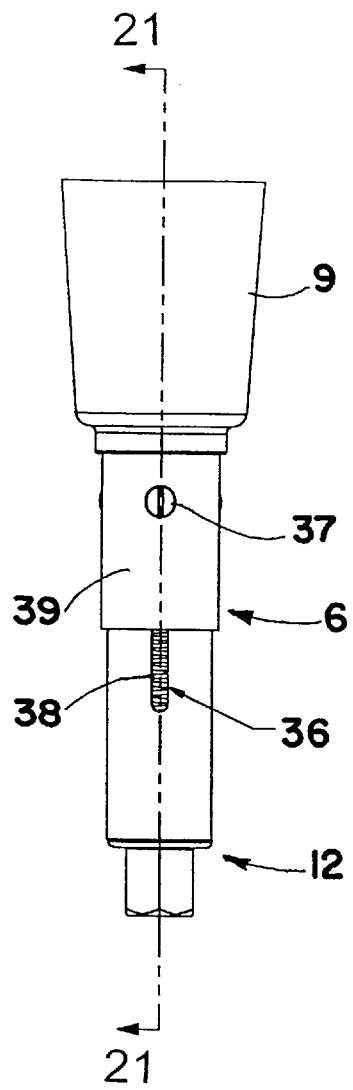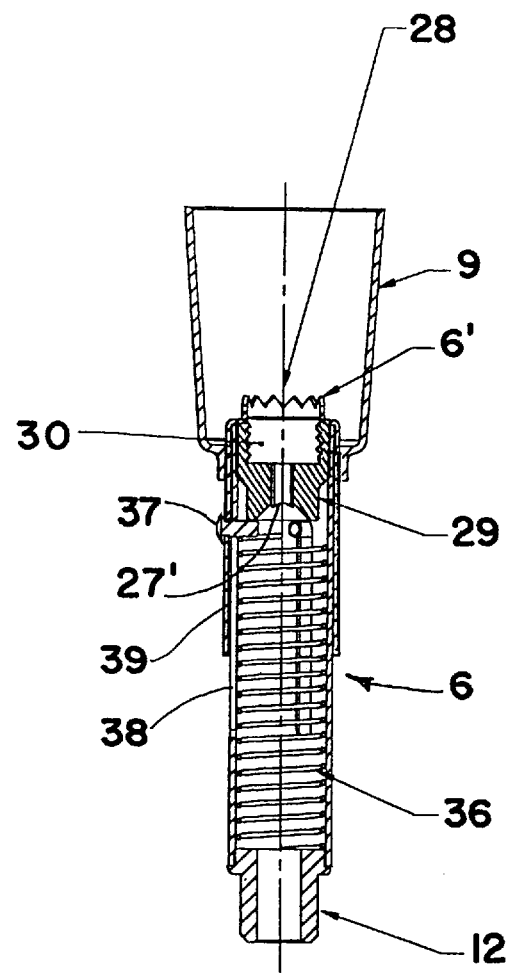
FIG. 20
FIG. 21

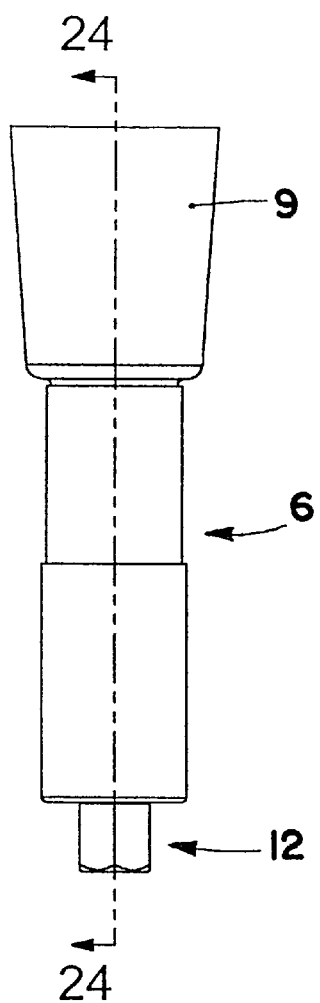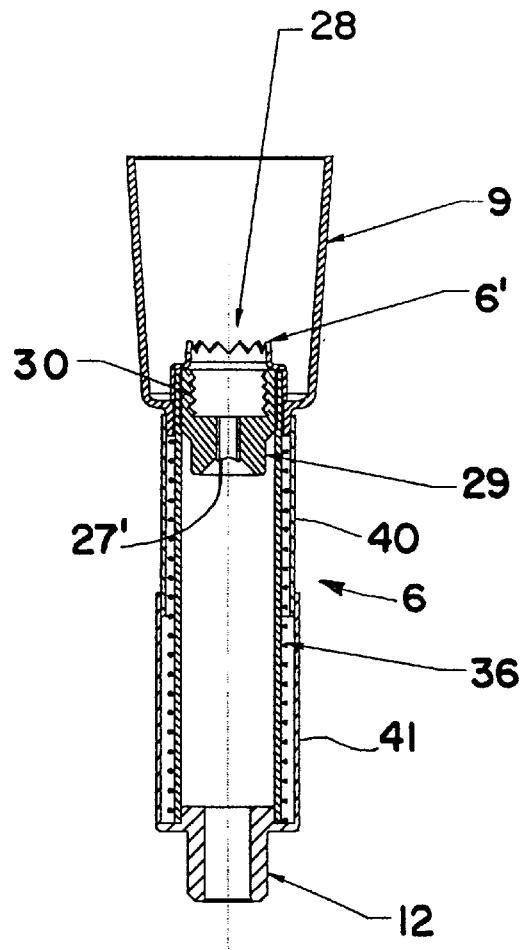
FIG. 23
FIG. 24

NUT CUTTER

CROSS REFERENCE TO RELATED APPLICATIONS

This application claims the benefit of U.S. Provisional Application Ser. No. 60/229,969, filed Sep. 1, 2000.

FIELD OF THE INVENTION

This invention relates to a nut cutter tool for removing and cutting away threaded nuts that are frozen or seized onto a mating member such as a bolt, threaded stud, or threaded shaft.

BACKGROUND OF THE INVENTION

Threaded hardware such as a nut and bolt assembly often freeze up or seize together. The components become difficult or impossible to disassemble using the same wrenches and tools that were used to assemble them. Threaded hardware freezes together because of excessive tightening, corrosion and rusting over time, etc. Threaded nut and bolt assemblies are often painted multiple times over many years. This contributes to the assembly bonding together. In some circumstances threaded hardware has been originally assembled and bonded together with the use of an adhesive, solder, or other bonding material intentionally making disassembly difficult.

Often the exterior shape of a frozen nut becomes deformed while one is trying to remove it. Tools often slip rather than unthread the nut deforming the corners of the nut's exterior shape. Pliers or other gripping tools are often used in an attempt to grab the frozen nut and remove it. These tools often result in further deforming the exterior shape of the frozen nut.

Not all nuts that become locked onto a threaded member are metal. Plastic nuts also freeze onto threaded members. Being weaker than metal, the exterior shapes of a plastic nut deform easier. Pliers and other gripping tools often simply "chew up" the exterior of a frozen plastic nut rather than rotating it free.

Frozen hardware is a serious problem. People struggle and resort to many different means in an effort to release a frozen nut from a bolt. Oil or a special release agent is sometimes used hoping to penetrate the threaded assembly and break the frozen members free. People sometimes apply heat with a welding torch heating the hardware "red hot" in an effort to help remove the frozen threaded parts. People resort in trying to chisel, chip away, and split frozen hardware apart. Tremendous aggravation and unnecessary additional repairs and replacement of parts to work around and deal with result from frozen threaded assemblies. The problem of frozen hardware exists in machines, cars, products and almost all industries including the plumbing field.

One common plumbing field problem is in removing (unbolting) an old faucet from a sink. Over the years corrosion and moisture freeze faucet mounting hardware to the threaded shanks of a faucet. Further complicating matters is the fact that the space under and behind a sink that one has available to access faucet mounting hardware is limited. Plumbers and homeowners purchase special plumbing wrenches hoping to assist them. They often unsuccessfully resort to chiseling away hoping to break free frozen mounting hardware. In the end plumbers and homeowners frequently end up replacing an entire sink and in some cases even a countertop along with the faucet because they cannot remove the old faucet from the existing sink.

SUMMARY OF THE INVENTION

The present invention relates to a nut cutting tool with a cutting head that allows an operator to easily and safely cut away a nut that is frozen to a threaded stud/bolt. This disclosure illustrates and describes the invention relative to removing frozen faucet mounting hardware. However, the invention applies in numerous industries and other applications besides plumbing and faucets.

BRIEF DESCRIPTION OF THE DRAWINGS

In the annexed drawings:

FIG. 20 is a side elevation view of another form of nut cutter of the present invention;

FIG. 21 is a longitudinal section through the nut cutter of FIG. 20;

FIG. 23 is a side elevation view of another form of nut cutter of the present invention;

FIG. 24 is a longitudinal section through the nut cutter of FIG. 23; and

DETAILED DESCRIPTION OF THE INVENTION

Figure 1:
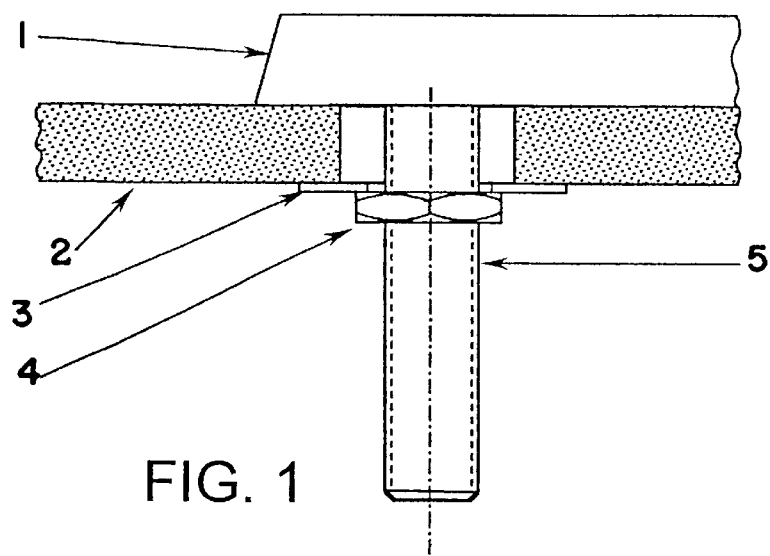
FIG. 1 is a schematic fragmentary longitudinal section through a sink or countertop showing a faucet mounted thereto by a nut threaded onto the threaded shank of the faucet.

Referring now in detail to the drawings, FIG. 1 shows a typical cutaway partial view of a faucet 1 mounted to a sink or countertop 2. Faucets generally use metal threaded hardware which are often brass. However, other material such as plastic, zinc and steel are used. Different materials are often assembled together. The faucet 1 may be mounted to a sink 2 with a washer 3 and nut 4 that is threaded onto the faucet shank 5.

Figure 2:
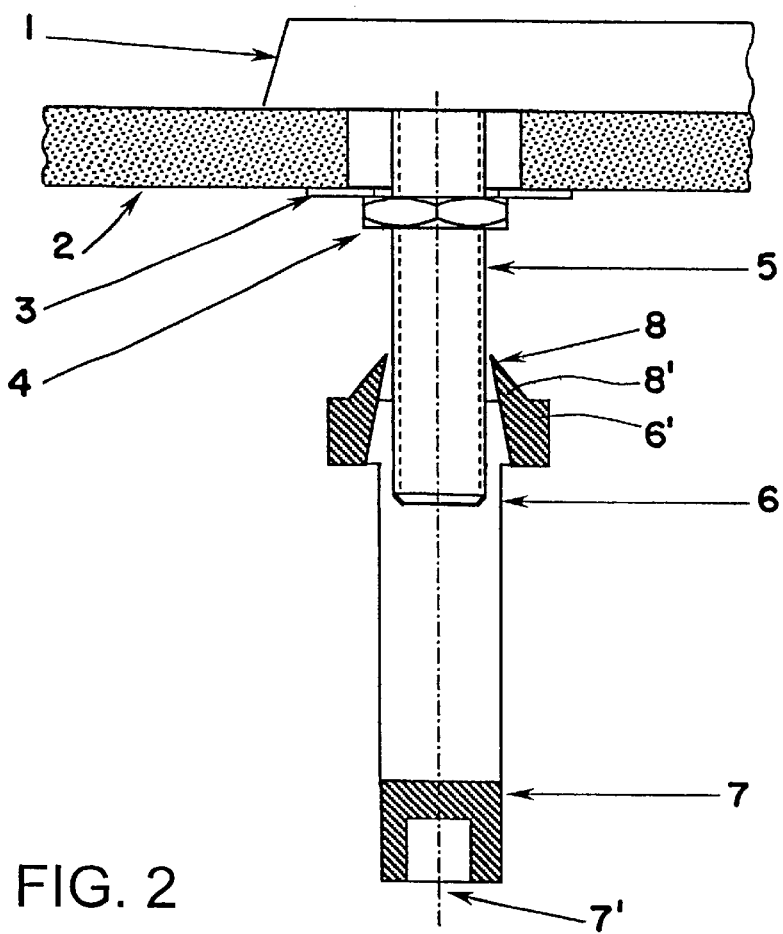
FIG. 2 is a schematic fragmentary longitudinal section showing one form of nut cutter tool of the present invention including a cutter head placed over the threaded shank of the sink or countertop mounted faucet of FIG. 1.

FIG. 2 shows one nut cutter 6 embodiment of the present invention including a ring shaped cutter head 6' at its outboard end having an inner diameter slightly greater than the outer diameter of the faucet shank 5 so that the cutter head can be placed over the faucet shank. Removing a faucet from a sink generally requires the operator to work lying on his back and in uncomfortable positions in a confined space. Another problem with working on faucets is that debris falls into the operator's face and eyes. It is recommended that eye protection be worn, but people generally do not follow this advice.

The nut cutter 6 works by rotating the cutter head 6', causing the cutter blades 8 to cut away the nut 4. Metal or plastic shavings are produced and fall when using this tool. This is a serious safety problem which is addressed in other embodiments of the invention.

The exterior 7 of the inboard end of the nut cutter 6 is shaped to accept a wrench or a socket so rotational force can be applied to create the cutting action.

The nut cutter 6 also has an internal square shaped socket 7' at its inboard end to accept a standard ratchet wrench for ease of use.

The cutter head 6' is illustrated in FIG. 2 as a single piece. However, the points or blades 8 of the cutter head 6' that actually do the cutting can be removable inserts able to be changed if desired.

Figure 3:
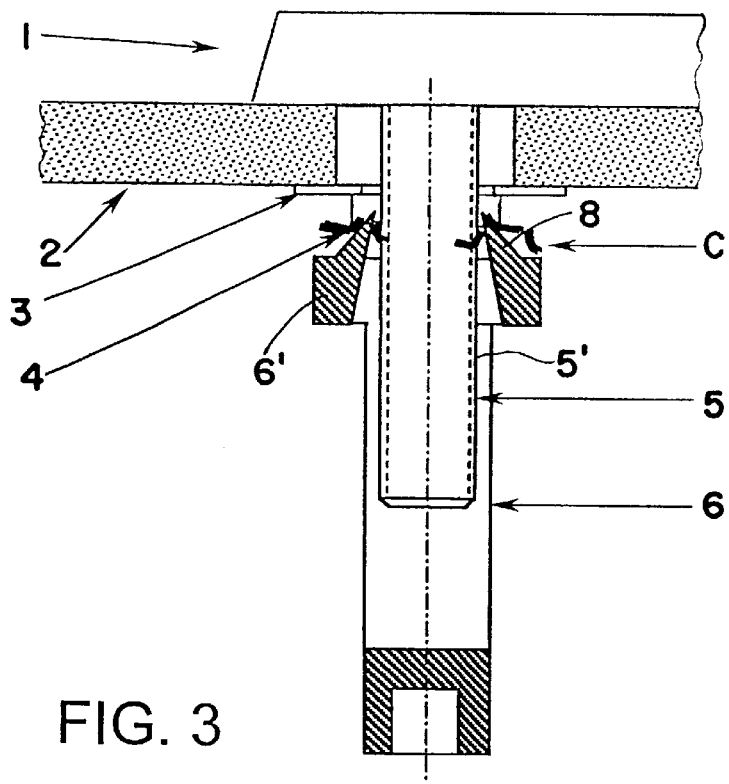
FIG. 3 is a schematic fragmentary longitudinal section showing the cutter head of FIG. 2 cutting away the nut.
Figure 4:
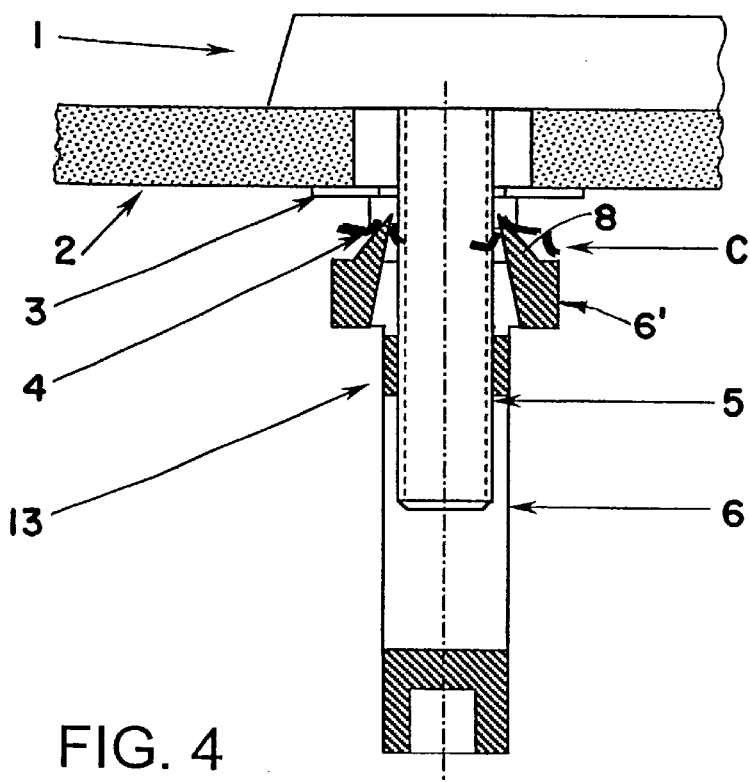
FIG. 4 is a schematic fragmentary longitudinal section showing a nut cutter similar to FIG. 3 but with a guide that closely fits over the threaded shank to guide and keep the cutter head aligned with the shank.
Figure 5:
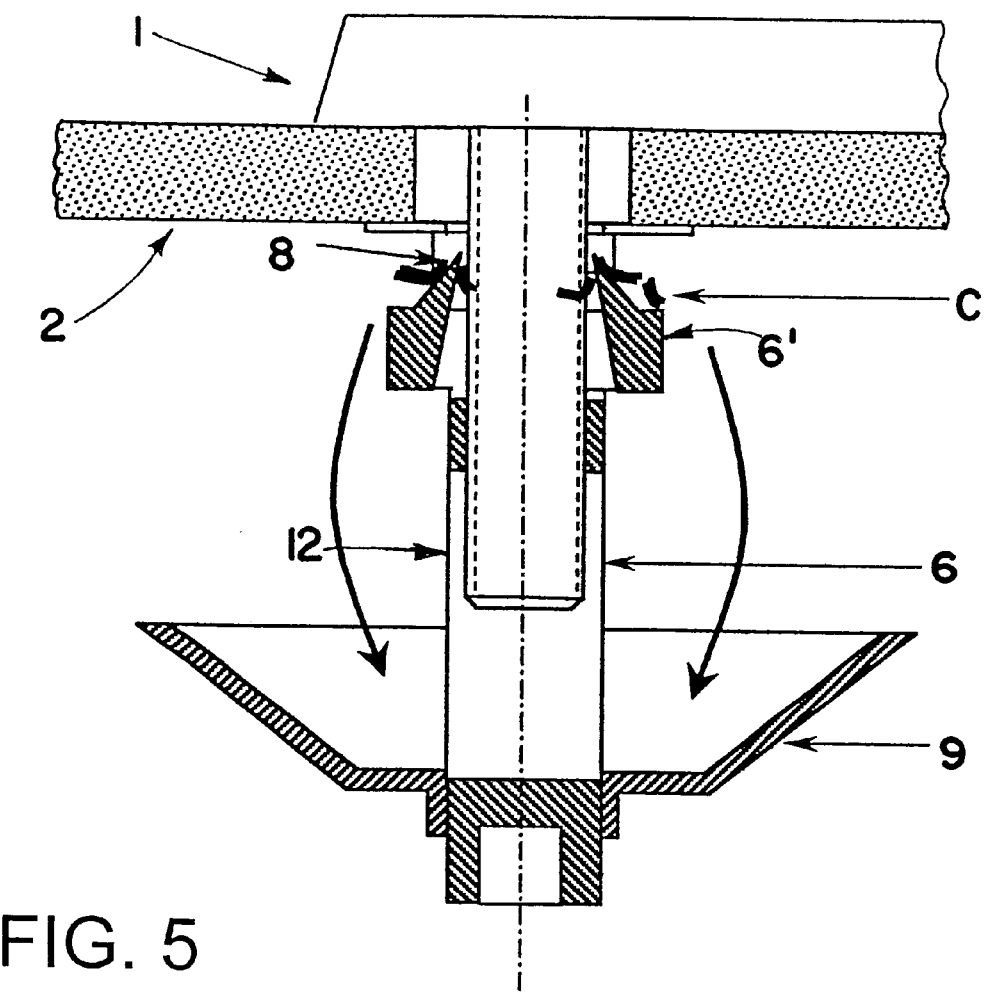
FIG. 5 is a schematic fragmentary longitudinal section showing a nut cutter similar to FIG. 4 but with a chip guard attachment to catch falling chips and debris.

FIGS. 3–5 show chips C generated by the cutter blades 8 cutting away the nut 4. The entire nut 4 that is engaged with the faucet shank threads 5' may not have to be totally removed. Leaving part of the nut 4 as a thin sleeve still attached to the shank may provide enough relief for the nut to pass through the washer 3 and permit 10 the shank to be lifted through the sink 2. Enhanced cutter heads and ways of insuring total nut removal are described hereafter. If the cutter head 6' cuts into or through the washer 3 or shank threads 5', that is not a problem since these are not critical reusable components.

ENHANCED CUTTER HEADS

The cutter head 6' may be a removable and interchangeable component of the nut cutter tool. Cutter heads may have removable teeth or blade inserts 8 as previously mentioned. Cutter heads may also be adjustable in diameter to insure total clean-out of the frozen nut. Adjustability would also permit the cutter head to work on various sizes of threaded assemblies. A thread cutting die could also be incorporated into the cutter head 6' to literally re-cut the existing male thread on the male threaded member insuring bringing the male threaded member back into working/reusable condition after total clean out and removal of the nut.

The nut cutter 6 could be made to work by rotating the cutter head 6' in a clockwise or counterclockwise direction. The cutter head 6' could also act as claws to grip and unthread the nut if by chance the nut were to break free while being cut away.

The nut cutter 6 may incorporate a guide 13 that fits closely over an existing male threaded member 5 to guide and keep the cutter head 6' aligned with the threaded member as shown in FIG. 4. Guide 13 could be a separate piece from the nut cutter or part of the nut cutter itself. Moreover, guide 13 may be threaded for threading onto the existing male threaded member 5 allowing a cutting-force to be applied against the frozen nut 4 when the cutter head 6' is rotated into cutting engagement with the nut. Further, the guide 13 could be removable from the nut cutter 6 so different size guides could be used to match and mate with different size threaded members.

CUTTING CHIPS

Figure 7:
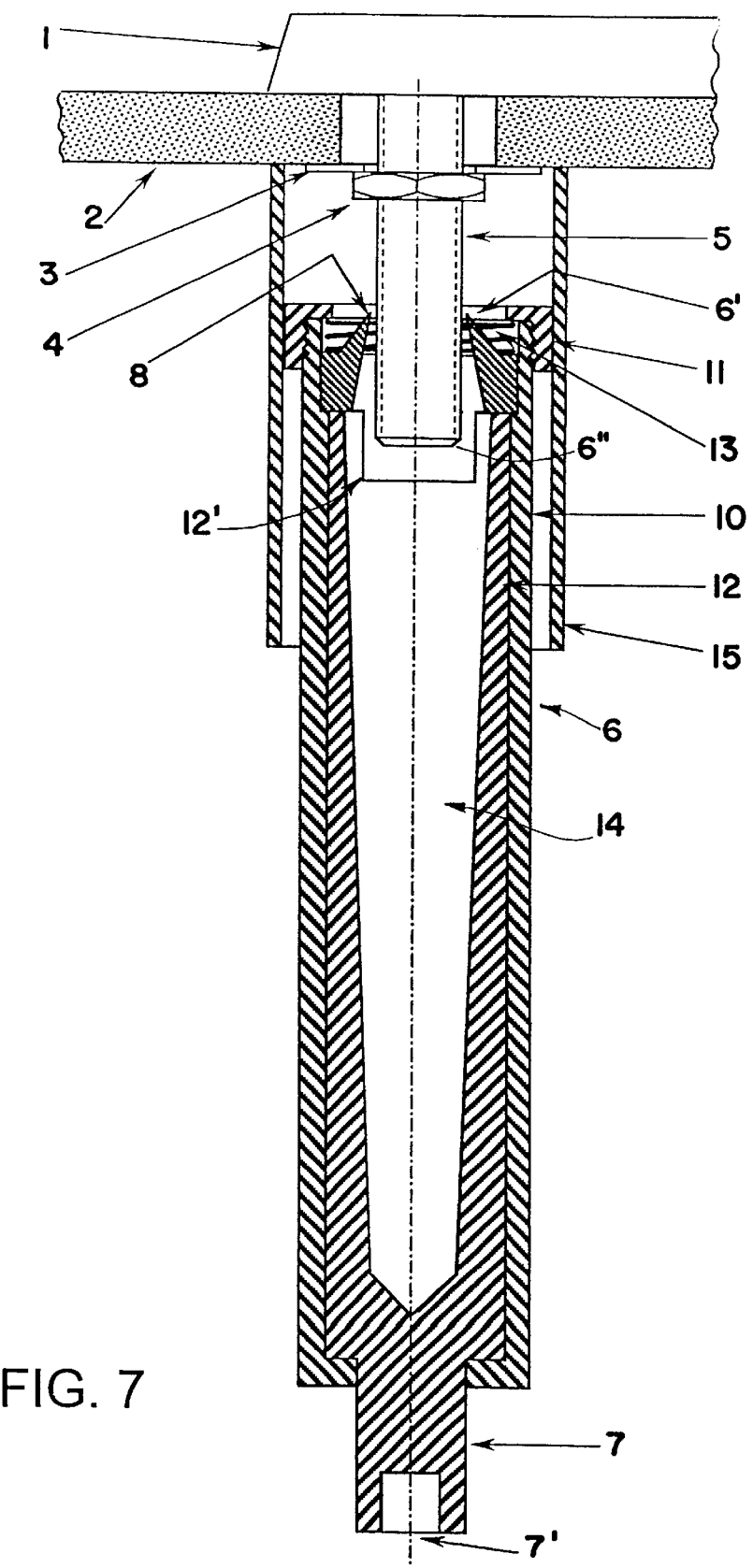

There are various disclosed methods of controlling the cutting chips C to prevent them from falling in the operator's face and eyes. FIG. 5 illustrates a chip guard 9 that could be made out of transparent plastic so the operator of the nut cutter 6 can see through the chip guard. Chip guard 9 acts as a container/reservoir attached to the nut cutter 6 to catch falling chips and debris. The design of the cutter head blades 8 will affect how the chips are formed. It is possible for the cutter head blades 8 to create small size chips or long continuous metal shavings. The cutter head 6' may have a single blade or multiple blades or teeth 8. The chip guard 9 shown in FIG. 7 is able to be slid up or down the driver portion 12 of the nut cutter 6 and positioned wherever desired by friction or other suitable clamping means or removed for emptying as desired.

ENHANCED TOOL DESIGNS

The embodiments described above illustrate the basic purpose and principles of the nut cutter tool of the present invention. The following nut cutter tool embodiments are designed to specifically remove and cut away frozen faucet hardware when the operator is forced to be positioned on his back and work upside down as in the case with a faucet. While the following embodiments are designed with faucet removal in mind, as stated previously, the invention applies in numerous industries and other applications besides plumbing and faucets.

Figure 6:
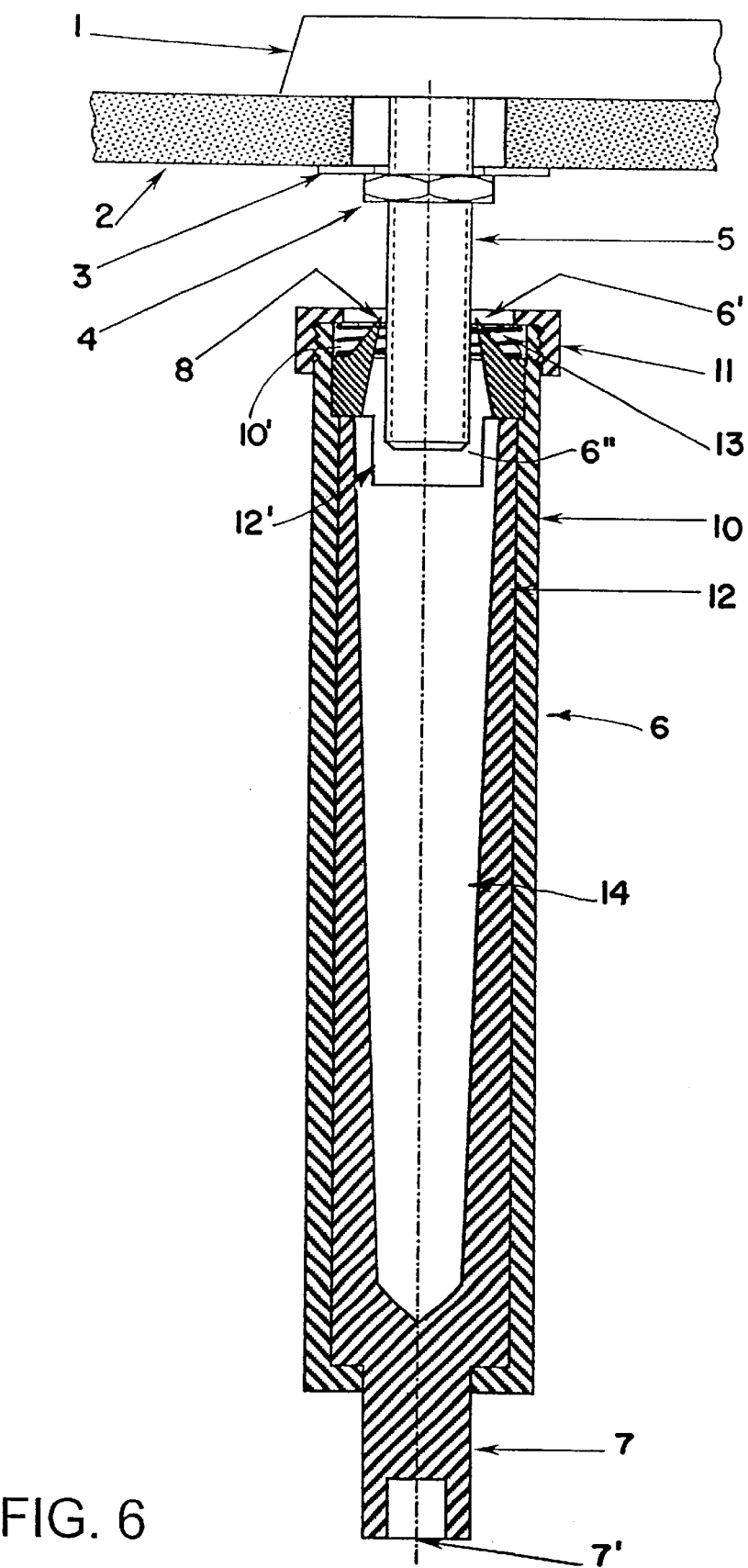
FIGS. 6, 7, and 8 are schematic fragmentary longitudinal sections showing other forms of nut cutter tools of the present invention including a cutter head placed over the threaded shank of a sink or countertop mounted faucet.

FIG. 6 shows a cutter head 6' as a separate piece that may be removed for sharpening or replacement as desired. Being removable allows different sizes or types of cutter heads to be used with the same cutter tool. Cutter head 6' is loosely received within a chamber 10' in the outboard end of a body 10 surrounding the cutter driver 12 and is retained therein as by providing a removable hold down cap 11 externally threaded onto the outboard end of the body. The cutter driver 12 is rotatably and axially movable relative to the body 10 and has one or more keyways 12' in its outboard end that drivingly receive correspondingly shaped keys 6' on the inner end of the cutter head 6'. The cutter head 6' is spring loaded by a spring 13 between the hold down cap 11 and cutter head so that its blades 8 do not protrude beyond the outboard end of the nut cutter 6 unless an upward force is applied to the cutter driver 12 with the hold down cap 11 pressed up against the under side of the sink or countertop 2. This is a safety feature that helps in preventing the blades 8 from being exposed except when the tool is in use. The cutter driver 12 may be hollow as shown to serve as a reservoir 14 to collect cut chips which are directed toward the center area and into the reservoir 14 by the blades 8.

FIG. 7 shows the cutting tool design of FIG. 6 with a sleeve-like chip guard 15 that may be slid up or down relative to the hold down cap 11 and positioned wherever desired. Positioning the chip guard 15 up against the under side of the sink or countertop 2 insures safety and control by containing the cutting chips and other debris within the chip guard during the nut cutting operation.

Figure 8:
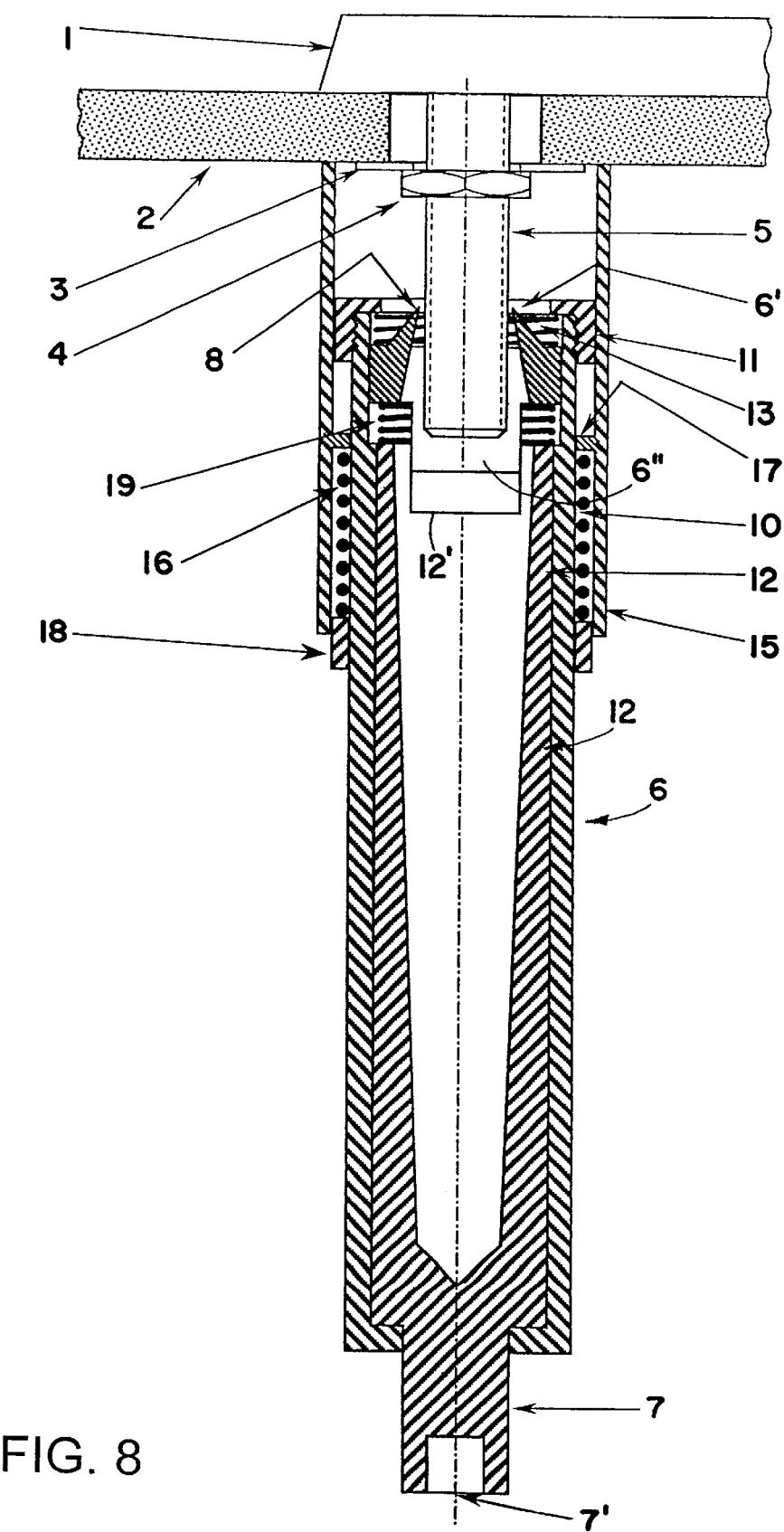

FIG. 8 shows the nut cutter 6 of FIG. 7 with a spring-loaded chip guard 15. A chip guard spring 16 is interposed between an inner flange 17 on the chip guard 15 and an external collar 18 on the body 10. The chip guard spring 16 insures that the chip guard 15 maintains contact with the under side of the sink or countertop 2 during the nut cutting operation. Keeping the chip guard 15 against or near the bottom of the sink or countertop 2 helps contain chips and debris from falling into the eyes of the tool operator. Being spring-loaded, the chip guard 15 also insures the cutting blades 8 are not exposed when the tool is not in use.

Also shown in FIG. 8 is a rebound spring 19 disposed between the cutter head 6' and cutter driver 12, enabling the cutter head 6' to rebound back away from the nut 4 being cut if too much cutting force is applied to the nut by the cutting blades. This helps the operator find the best balance of forcing the cutter blades 8 into engagement with the nut and allowing the cutter head to rebound back and take a shallower level of cut while being rotated. The rebound spring 19 also enables the cutter blades 8 to maintain some contact with the nut and possibly continue cutting the nut while being rotated in either a clockwise or counterclockwise direction.

TYPES OF CUTTERS

FIGS. 2–8 show a pointed blade-like cutter head 6' that will cut through a frozen nut starting from the bottom exposed side of the nut. However, this is just one direction that the cutter head can cut away at the nut. For example, the cutting teeth or blades 8 could be around the inside diameter of the ring shaped cutter head 6'. Also, the ring diameter of the cutter head 6' could be adjustable to accommodate different sizes of nuts. A cutter head with cutting teeth or blades around its inside diameter will cut away or shave down the outer diameter of the nut. The amount of material that the ring cutter will remove could be controlled by taking one cut, then adjusting the diameter of the ring cutter blades smaller and taking another cut and so on until the nut is substantially completely cut or shaved away.

If a ring-like cutter head is used, it does not have to be adjustable. There could be various fixed sizes of cutter heads that are interchangeable. A ring-like cutter head should provide the ability to easily control and direct where the cutting chips go.

The cutter head 6' could also be designed to shave the face of the nut away. The best cutting approach may be a combination of an angle, face or side direction.

POWERIZED NUT CUTTERS

Figure 9:
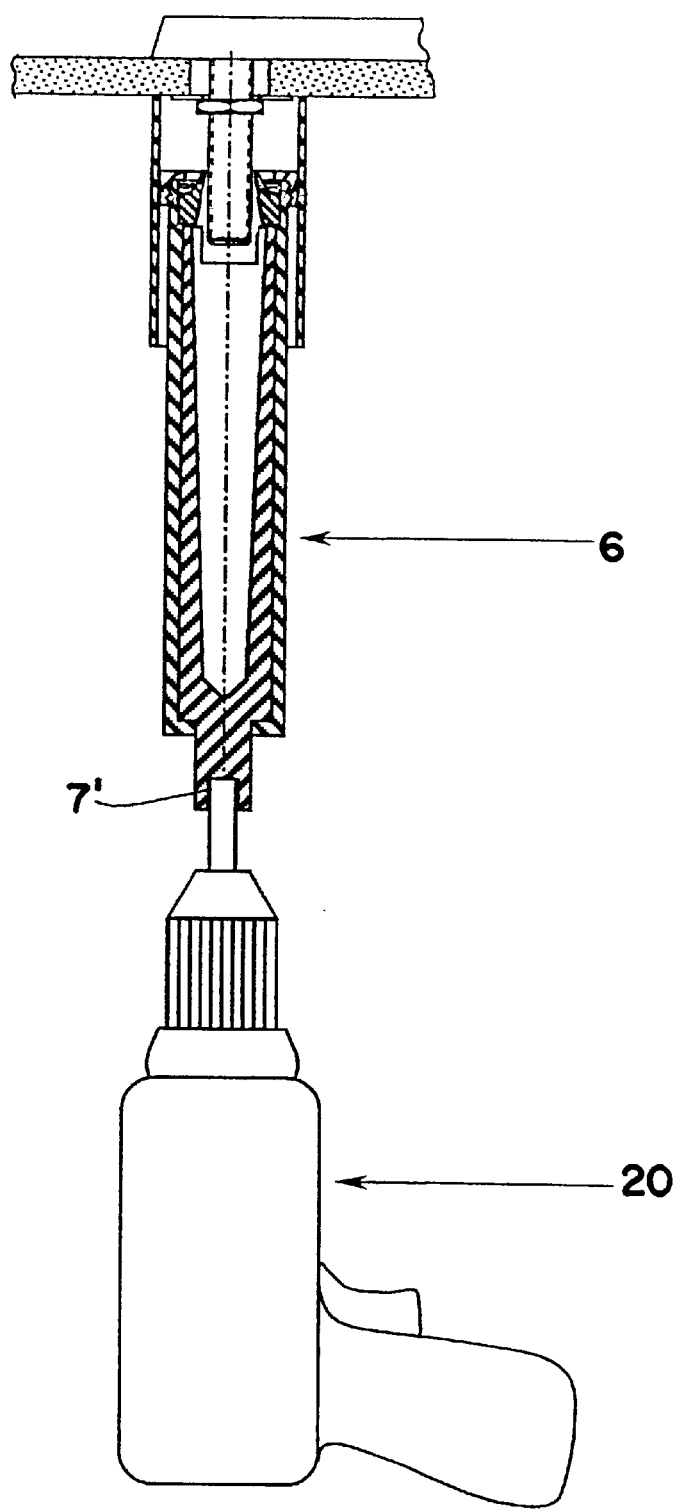
FIG. 9 is a schematic fragmentary longitudinal section showing a nut cutter of the present invention driven by a cordless drill or screwdriver.

The nut cutter embodiments disclosed herein may be operated manually or rotated by an electric power drill or other means of power. For example the driving socket 7' of the cutter tool may be engaged by a conventional cordless power drill or cordless screwdriver 20 as shown in FIG. 9.

Figure 10:
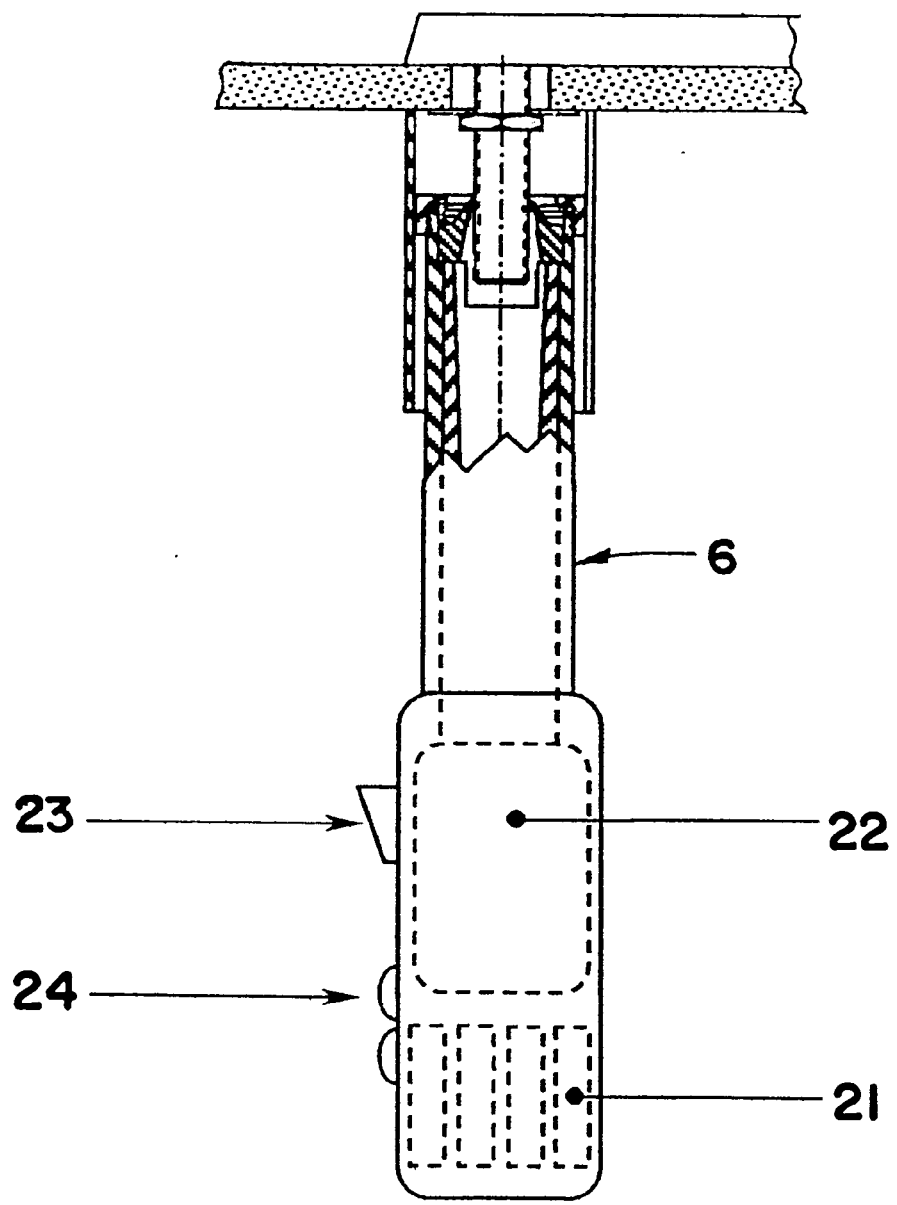
FIG. 10 is a schematic fragmentary longitudinal section showing the nut cutter of FIG. 9 with a self-contained power source and motor for driving the nut cutter.

Also the nut cutter 6 could include a self-contained power source 21 and motor 22 to be a power tool itself as shown in FIG. 10. The power source 21 could be cordless or plug into an electrical outlet as desired. An off/on switch 23 may be provided for turning the motor 22 off and on, and forward and reverse buttons 24 may be included for causing the motor to drive the nut cutter head in either direction.

CLAMPING THE NUT CUTTER TO THE FAUCET SHANK

FIGS. 11–25 show two different mechanisms for releasably locking the nut cutter tool 6 to a faucet shank so the nut cutter tool holds itself in place in axial alignment with the faucet shank freeing up both hands of the operator during the nut cuffing operation. The locking mechanism 25 shown in FIGS. 11–16 includes an external cone shaped faucet shank gripper 26 on the outboard end of a gripper driver 27 that can be rotated and driven into the axial outer end of the faucet shank. The gripper 26 has fluted or spiraled gripping grooves 26' on its outer surface that bite into and grip the axial outer end of the faucet shank holding the tool in place. 10 The gripper driver 27 is axially and rotatably movable relative to cutter driver 12 which coaxially surrounds gripper driver 27 and has a plurality of circumferentially spaced keys 12' at its outboard end that drivingly engage keyways 8' in the inner end of the cutter head 6' surrounding gripper 26 as schematically shown in FIGS. 12, 16 and 19.

The locking mechanism 28 shown in FIGS. 17–25 includes a female threaded pocket-like clamp-on piece 29 (see FIGS. 18, 19, 21 and 24) that has internal threads 30 that thread onto the faucet shank clamping the tool in place.

Figure 11:
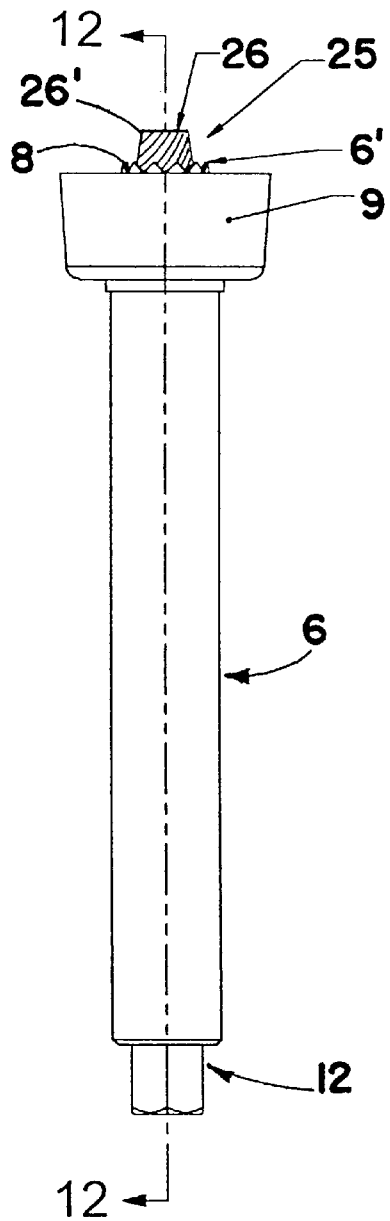
FIG. 11 is a schematic side elevation view of another form of nut cutter of the present invention.
Figure 12:
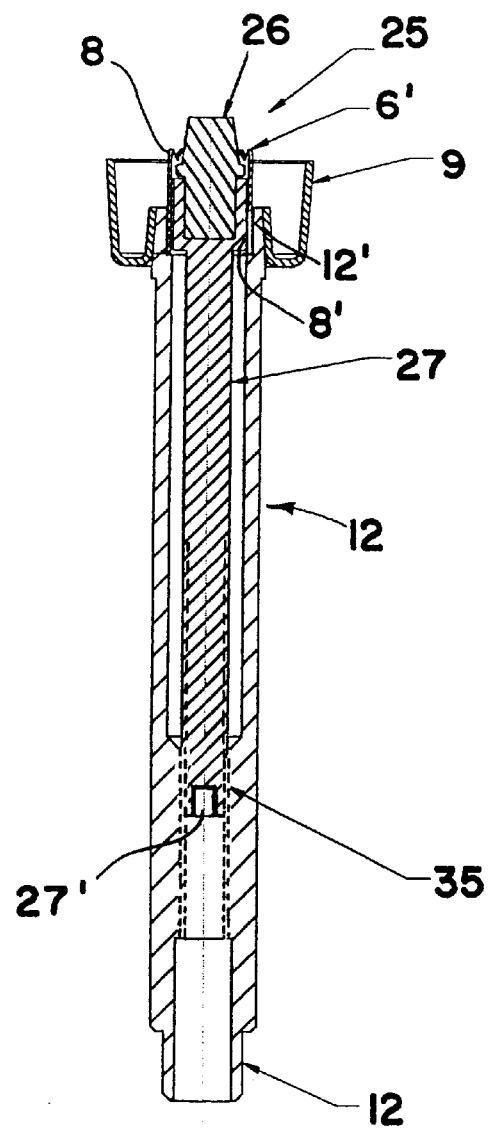
FIG. 12 is a longitudinal section through the nut cutter of FIG. 11.
Figure 15:
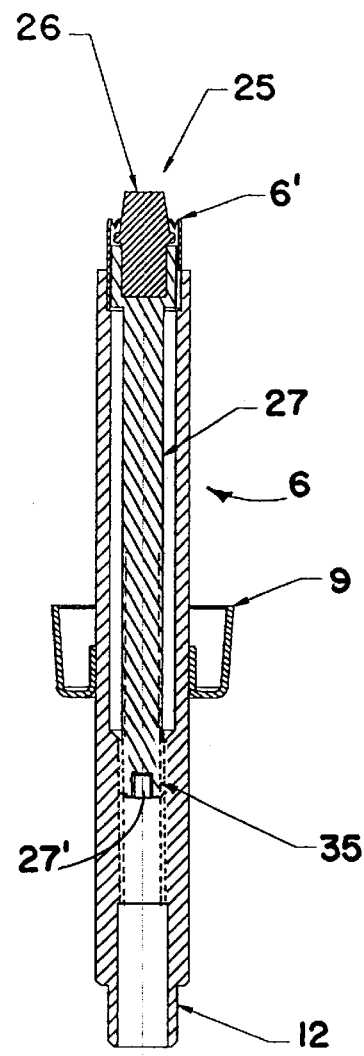
FIG. 15 is a longitudinal section through the nut cutter of FIG. 14.
Figure 16:
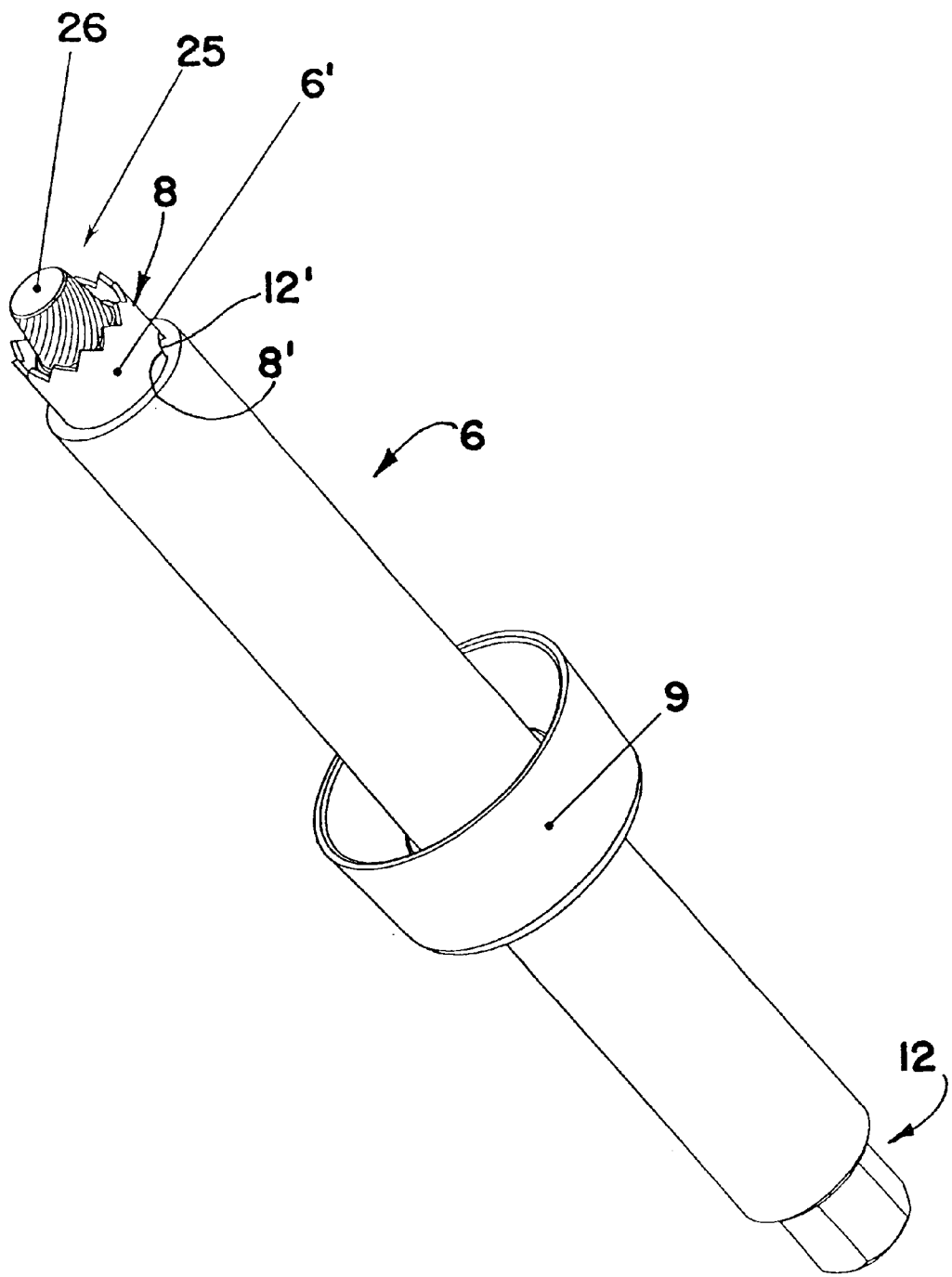
FIG. 16 is an enlarged perspective view of the nut cutter of FIGS. 13 and 14.
Figure 17:
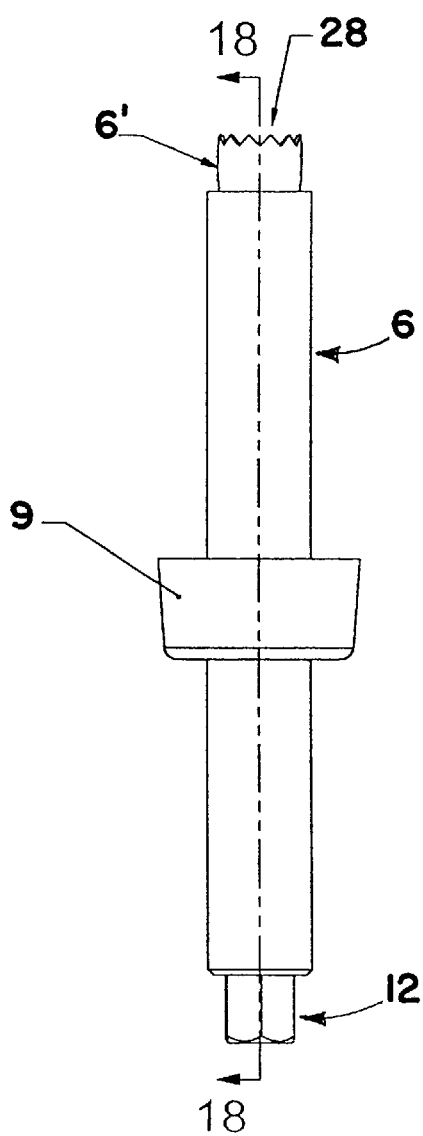
FIG. 17 is a side elevation view of another form of nut cutter of the present invention.
Figure 18:
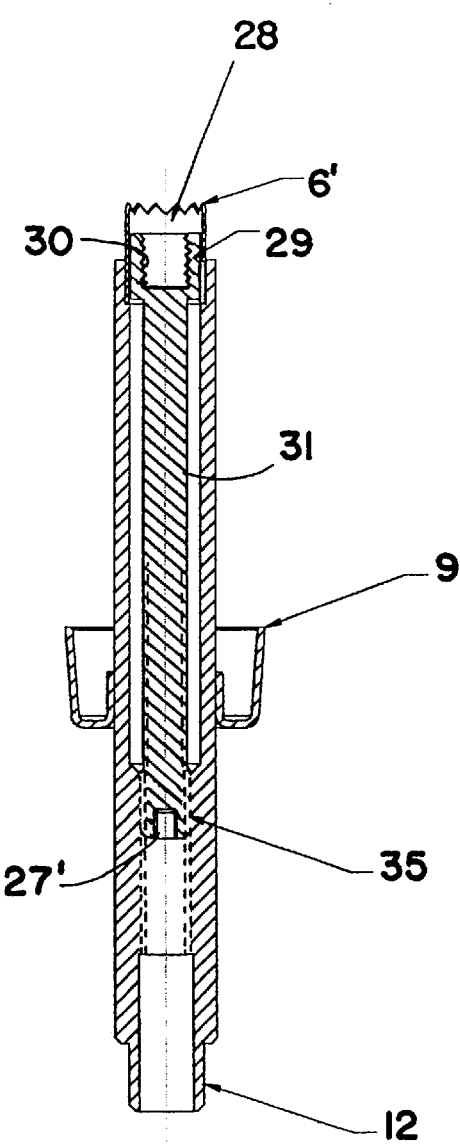
FIG. 18 is a longitudinal section through the nut cutter of FIG. 17.
Figure 19:
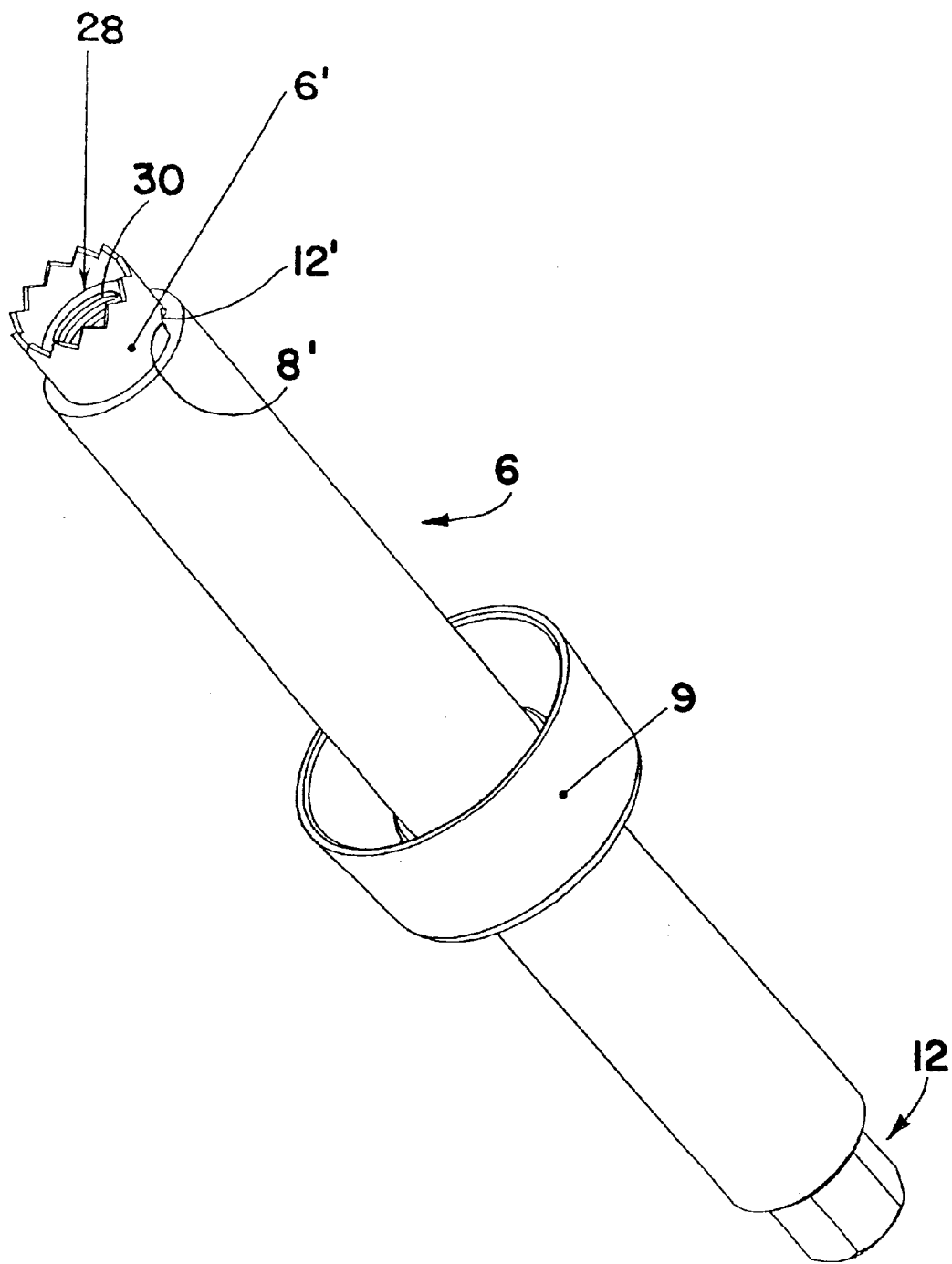
FIG. 19 is an enlarged perspective view of the nut cutter of FIGS. 17 and 18.

Both the cone-like faucet shank gripper 26 of FIGS. 11–16 and the clamp-on piece 29 of FIGS. 17–19 can be rotated with a standard ratchet wrench extension that is inserted into the bottom of the tool for engagement with a socket 27' in the inboard end of the gripper driver 27 as shown in FIGS. 12 and 15 or the shank portion 31 of the clamp-on piece 29 as shown in FIG. 18.

MECHANICALLY DRIVING THE NUT CUTTER INTO THE NUT

Once the nut cutter 6 is clamped onto the faucet shank 5, the operator may start rotating the cutter driver 12 to rotate the cutter head 6'. If the gripper driver 27 and cutter driver 12 are threaded together as shown at 35 in FIGS. 12 and 15, when the operator rotates the cutter driver 12, the threaded connection 35 between the cutter driver 12 and gripper driver 27 will cause the cutter driver 12 to travel upwards relative to the gripper driver forcing the cutter blades 8 on the cutter head 6' into the nut 4 while the cutter driver is being rotated. This gives the operator a mechanical advantage of forcing the cutter blades 8 into the nut at a rate which may be controlled by selecting the pitch of the threads of the threaded connection 35. The same is true if the shank portion 30 of the clamp-on piece 29 and cutter driver 12 are threaded together as shown at 35 in FIG. 18.

The shank clamp-on piece 29 shown in FIGS. 20–25 does not have a threaded connection with the cutter driver 12, but nevertheless has a socket 27' that permits the clamp-on piece to be rotated independently of the cutter driver 12 by inserting a standard ratchet wrench extension through the bottom of the cutter driver into engagement with the socket 27'.

Locking or clamping the nut cutter 6 to the faucet shank 5 aligns the nut cutter with the faucet shank eliminating sideways movement and insuring a proper cut is made.

Figure 13:
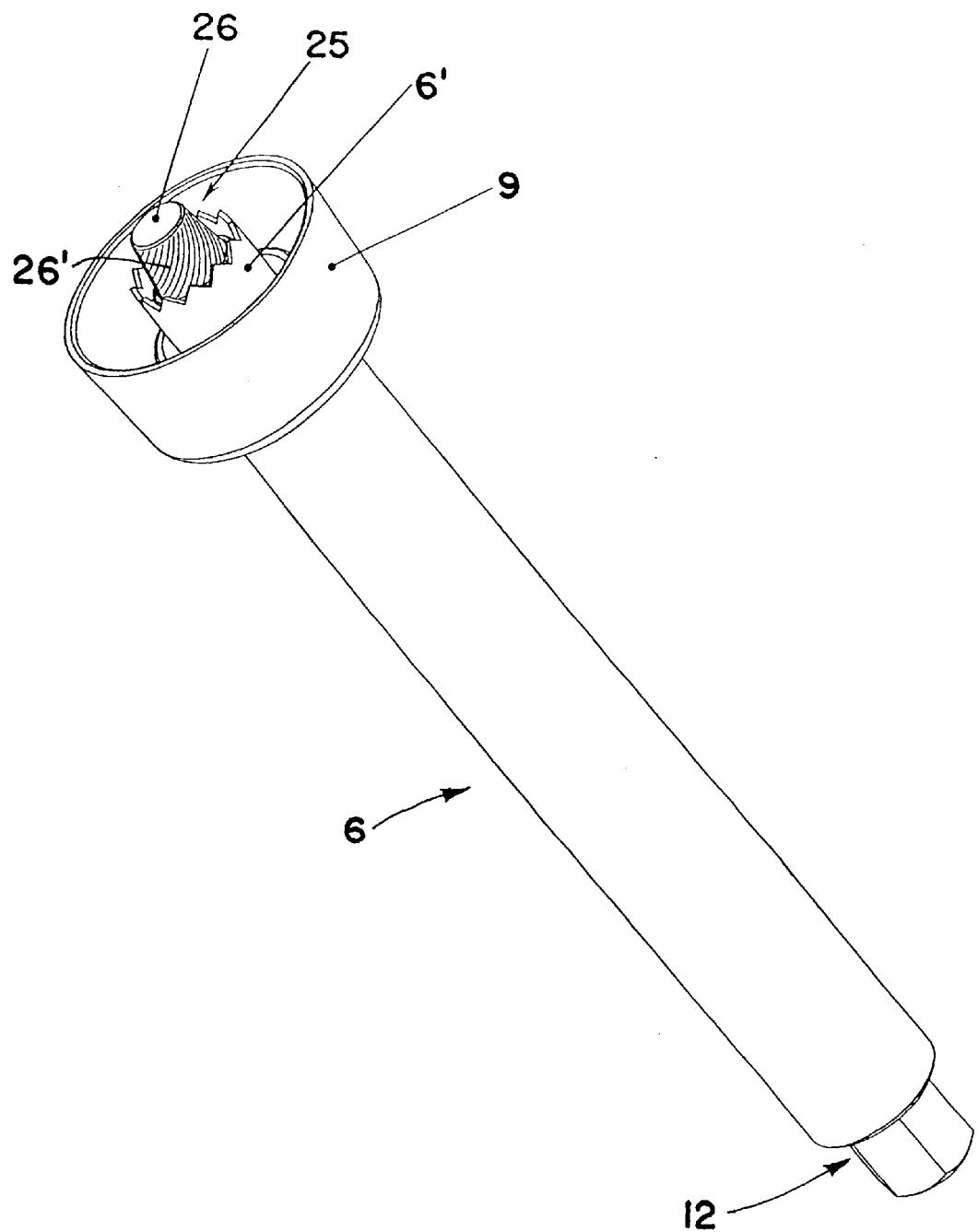
FIG. 13 is an enlarged perspective view of the nut cutter of FIGS. 11 and 12.
Figure 14:
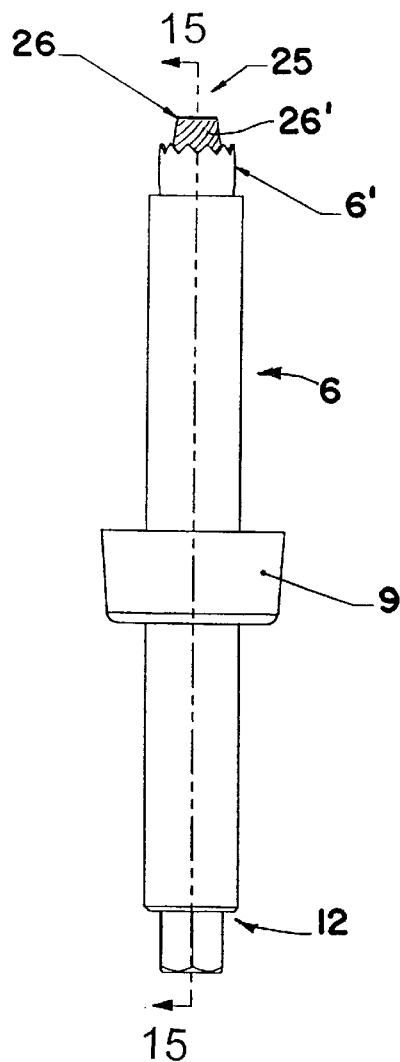
FIG. 14 is a schematic side elevation view of another form of nut cutter of the present invention.

FIGS. 11–13 show a chip guard 9 that is press fitted onto the outboard end of the cutter driver 12, whereas the chip guard 9 shown in FIGS. 14–19 is able to be slid up or down the cutter driver 12 and removed for emptying if desired.

Figure 22:
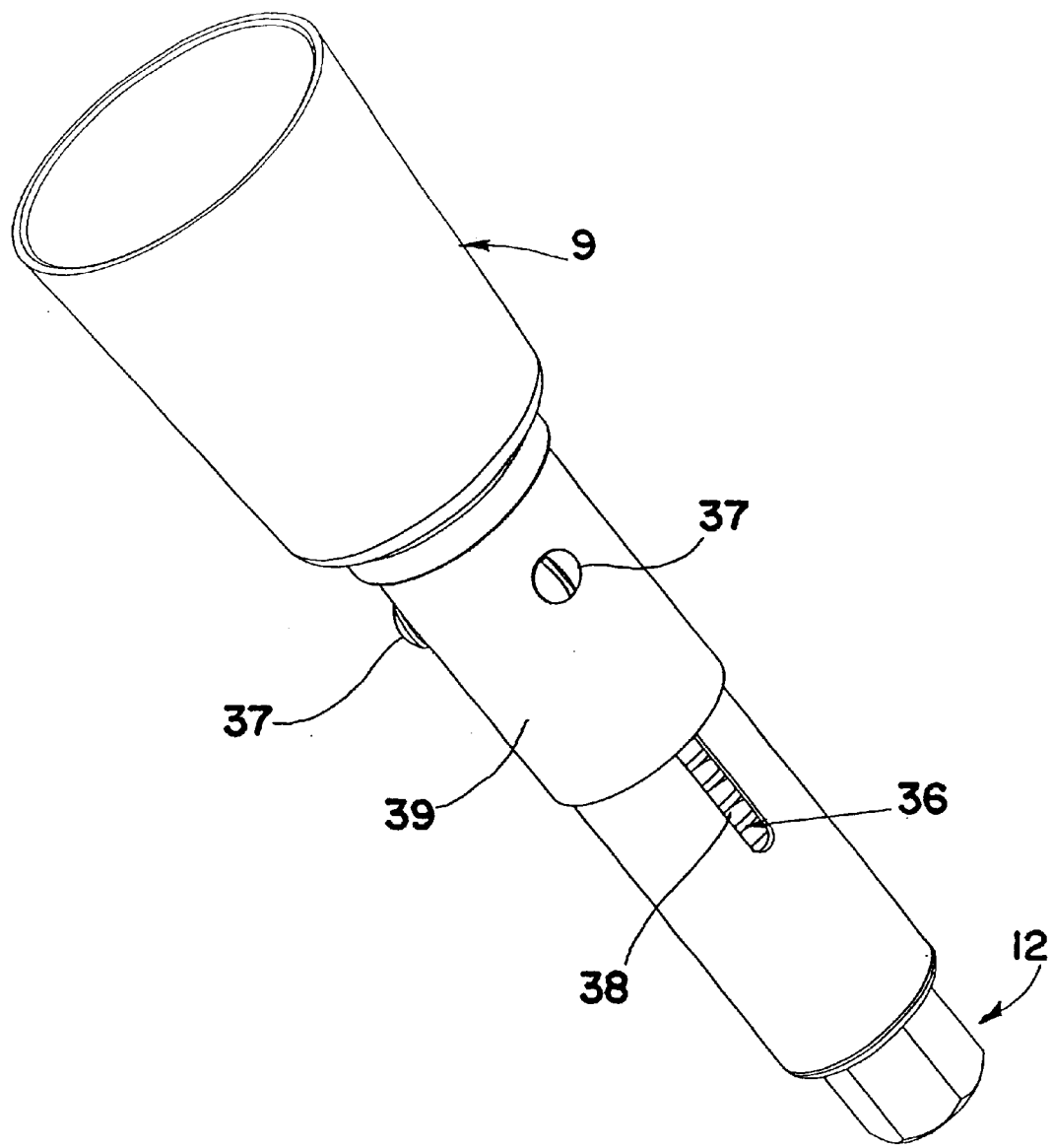
FIG. 22 is an enlarged perspective view of the nut cutter of FIGS. 20 and 21.
Figure 25:
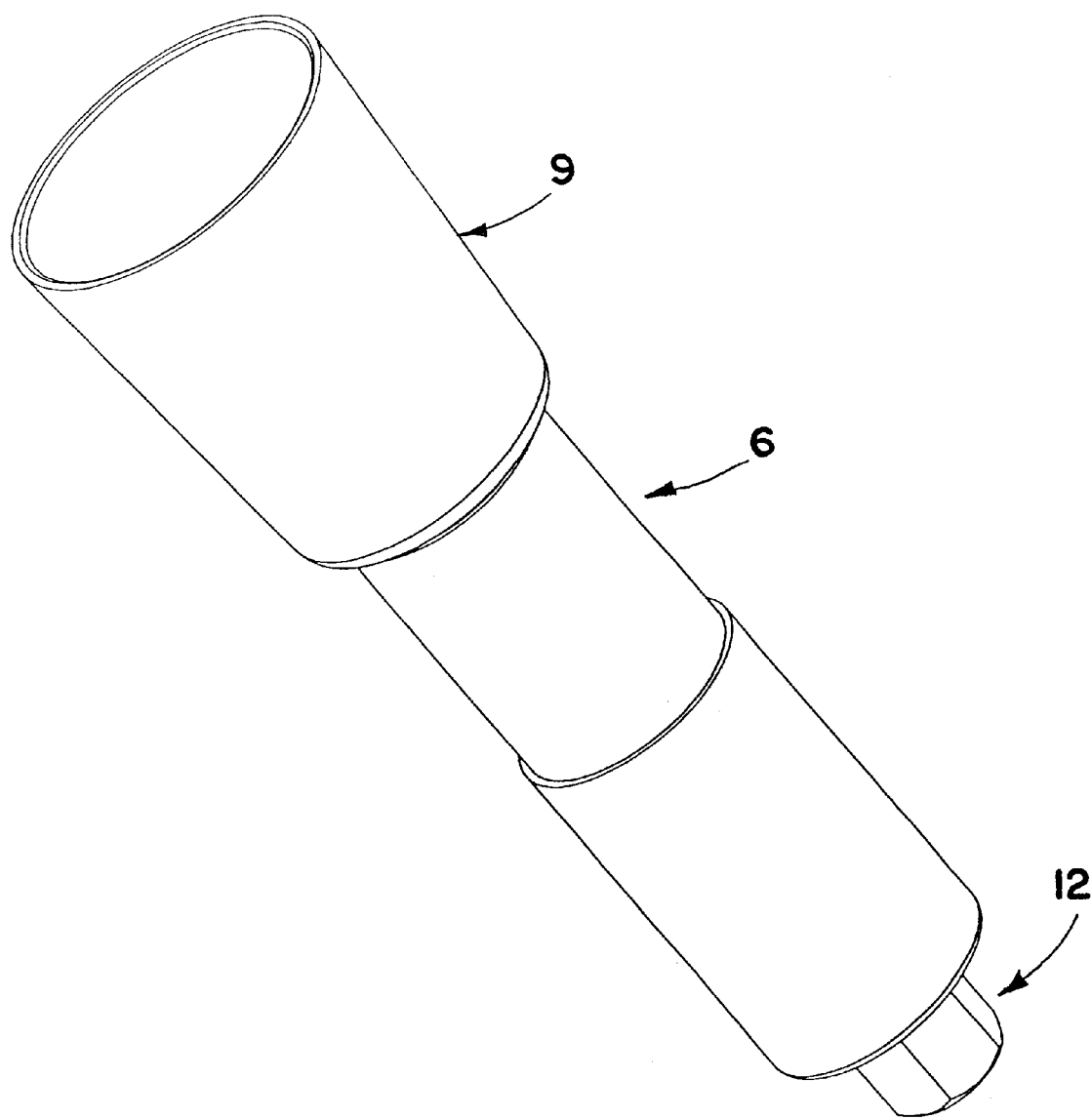
FIG. 25 is an enlarged perspective view of the nut cutter of FIGS. 23 and 24.

FIGS. 20–25 show a chip guard 9 that is spring loaded by a chip guard spring 36 insuring that the chip guard maintains contact with the under-side of the sink or countertop during the nut cutting operation so that virtually all of the chips are caught. In FIGS. 20–22 the chip guard spring 36 is contained within the cutter driver 12 and applies a spring force to one or more pins 37 which extend through one or more longitudinal slots 38 in the wall of the cutter driver. These pins 32 are in turn connected to a sleeve extension 39 of the chip guard 9 surrounding the outboard end of the cutter driver 12 for transferring the spring force to the chip guard. The axial length of the slots 38 provide for limited relative axial movement between the chip guard 9 and cutter driver 12 during the nut cutting operation. In FIGS. 23–25 the chip guard spring 36 surrounds the cutter driver 12 and acts directly on the axial inner end of the chip guard 9. A pair of telescoping sleeves 40 and 41 respectively affixed to the chip guard 9 and cutter driver 12 surround the spring 36 to protect it from the elements.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. A nut cutter tool comprising a cutter head, a rotatable driver drivingly connectable to said cutter head for rotating said cutter head during rotation of said driver, said cutter head being detachable from said driver for sharpening or replacement of said cutter head, a tubular body member surrounding said driver, said body member having an outboard end extending axially beyond an end of said driver to which said cutter head is drivingly connectable, said outboard end of said body member providing a chamber adjacent said end of said driver in which said cutter head is removably received, and a removable cap on said outboard end of said body member, said cap having an axial opening through which cutting blades on said cutter head extend during cutting of a nut while preventing said cutter head from being removed from said chamber without first removing said cap from said body member, said cap being threadedly connectable to said outboard end of said body member.

2. The tool of claim 1 wherein said driver and said cutter head are keyed together.

3. The tool of claim 1 wherein one of said driver and said cutter head has at least one key that is receivable in a keyway in the other of said driver and said cutter head.

4. The tool of claim 1 wherein said driver and said cutter head are rotatable and axially movable relative to said body member.

5. The tool of claim 4 further comprising a spring for biasing said cutter head and said driver axially inwardly relative to said body member so that cutting blades on said cutter head do not protrude axially outwardly beyond said body member unless an axial outward force is applied to said driver while said body member is restrained against axial outward movement.

6. The tool of claim 1 wherein said driver is hollow for collecting chips cut from a nut by cutting blades on said cutter head during a nut cutting operation.

7. The tool of claim 1 further comprising a chip guard on said tool for catching falling chips and debris during a nut cutting operation.

8. The tool of claim 7 wherein said chip guard is made of a transparent material so a tool operator can see through the chip guard.

9. The tool of claims wherein said chip guard is axially movable along said tool.

10. The tool of claim 7 wherein said chip guard is removable from said tool for emptying.

11. The tool of claim 7 wherein said chip guard is spring loaded in a direction urging said chip guard axially outwardly relative to said cutter head and said driver to insure that cutter blades on said cutter head are not exposed when said tool is not in use.

12. A nut cutter tool comprising a cutter head, a rotatable driver drivingly connectable to said cutter head for rotating said cutter head during rotation of said driver, said cutter head being detachable from said driver for sharpening or replacement of said cutter head, a tubular body member surrounding said driver, said body member having an outboard end extending axially beyond an end of said driver to which said cutter head is drivingly connectable, said outboard end of said body member providing a chamber adjacent said end of said driver in which said cutter head is removably received, said driver and said cutter head being rotatable and axially movable relative to said body member, a spring for biasing said cutter head and said driver axially inwardly relative to said body member so that cutting blades on said cutter head do not protrude axially outwardly beyond said body member unless an axial outward force is applied to said driver while said body member is restrained against axial outward movement, and a second spring between said cutter head and said driver enabling said cutter head to rebound back away from a nut being cut by cutting blades on said cutter head if too much cutting force is applied to the nut by said cutting blades.

13. A nut cutter tool comprising a cutter head, a rotatable driver drivingly connectable to said cutter head for rotating said cutter head during rotation of said driver, said cutter head being detachable from said driver for sharpening or replacement of said cutter head, and a guide on said tool that fits closely over an externally threaded member on which a nut to be cut is threaded to guide and keep said cutter head aligned with the threaded member during a nut cutting operation.

14. The tool of claim 13 wherein said guide is internally threaded for threading onto the externally threaded member.

15. The tool of claim 13 wherein said guide is removable from said tool so different size guides can be used to mate with different size externally threaded members.

16. A nut cutter tool comprising a cutter head, a rotatable driver drivingly connectable to said cutter head for rotating said cutter head during rotation of said driver, said cutter head being detachable from said driver for sharpening or replacement of said cutter head, and a chip guard on said tool for catching falling chips and debris during a nut cutting operation, said chip guard being press fitted onto said tool.

17. A nut cutter tool comprising a cutter head, a rotatable driver drivingly connectable to said cutter head for rotating said cutter head during rotation of said driver, said cutter head being detachable from said driver for sharpening or replacement of said cutter head, and a locking mechanism for releasably locking said tool onto an externally threaded member on which a nut to be cut is threaded to hold the tool in axial alignment with the threaded member during cutting of the nut.

18. The tool of claim 17 wherein said locking mechanism is axially and rotatably movable relative to said driver and said cutter head to permit axial and rotational movement of said driver and said cutter head relative to said locking mechanism after said locking mechanism has been locked onto the externally threaded member.

19. The tool of claim 18 wherein said locking mechanism has a socket accessible through said driver for engagement by a wrench extension for rotating said locking mechanism relative to said driver.

20. The tool of claim 18 wherein said locking mechanism has a threaded connection with said driver, whereby when said locking mechanism is locked onto the externally threaded member and said driver is rotated, said threaded connection will cause said driver to move axially relative to said locking mechanism providing a mechanical advantage during a nut cutting operation.

21. The tool of claim 20 wherein the mechanical advantage is controlled by selecting the pitch of the threads of the threaded connection.

22. The tool of claim 18 wherein the exteriorly threaded member is tubular, and said locking mechanism comprises an exterior cone shaped member that internally grips an end of the externally threaded member when moved into engagement therewith.

23. The tool of claim 22 wherein the exterior surface of said cone shaped member is grooved to bite into engagement with the end of the externally threaded member.

24. The tool of claim 18 wherein said locking mechanism comprises a female threaded clamp-on piece having internal threads that thread onto a threaded end of the externally threaded member.

25. The tool of claim 17 wherein said driver has a driving socket engageable by at least one of a power drill and power screwdriver.

26. The tool of claim 17 further comprising a self-contained power source and motor for driving said driver.

27. The tool of claim 17 further comprising a chip guard on said tool for catching falling chips during a nut cutting operation.

28. The tool of claim 27 wherein said chip guard is made of a transparent material so a tool operator can see through the chip guard during the nut cutting operation.

29. The tool of claim 27, wherein said chip guard is axially movable along said tool.

30. The tool of claim 27, wherein said chip guard is removable from said tool for emptying.

31. The tool of claim 27 wherein said chip guard is spring loaded in a direction urging said chip guard axially outwardly relative to said cutter head and said driver so that cutter blades on said cutter head are not exposed when said tool is not in use.

32. A nut cutter tool comprising a cutter head, a rotatable driver drivingly connected to said cutter head, and a chip guard on said tool for catching falling chips and debris during a nut cutting operation, said chip guard having a press fit on said tool.

33. A nut cutter tool comprising a cutter head, a rotatable driver drivingly connected to said cutter head, and a locking mechanism for releasably locking said tool onto an externally threaded member on which a nut to be cut is threaded to hold the tool in axial alignment with the nut during a nut cutting operation, said locking mechanism having a threaded connection with said driver, whereby when said locking mechanism is locked onto the externally threaded member and said driver is rotated, said threaded connection will cause said driver and said cutter head to move axially relative to said locking mechanism to provide a mechanical advantage during the nut cutting operation, the externally threaded member being tubular, and said locking mechanism comprising an external cone shaped member that internally grips an end of the externally threaded member when moved into engagement therewith.

34. The tool of claim 33 wherein said cone shaped member is grooved to bite into engagement with the end of the externally threaded member.

35. A nut cutter tool comprising a cutter head, a rotatable driver drivingly connected to said cutter head, and a locking mechanism for releasably locking said tool onto an externally threaded member on which a nut to be cut is threaded to hold the tool in axial alignment with the nut during a nut cutting operation, said locking mechanism having a threaded connection with said driver, whereby when said locking mechanism is locked onto the externally threaded member and said driver is rotated, said threaded connection will cause said driver and said cutter head to move axially relative to said locking mechanism to provide a mechanical advantage during the nut cutting operation, said locking mechanism comprising a female threaded clamp-on piece having internal threads that thread onto a threaded end of the externally threaded member.

36. A nut cutter tool comprising a cutter head, a rotatable driver drivingly connected to said cutter head, and a locking mechanism for releasably locking said tool onto an externally threaded member on which a nut to be cut is threaded to hold the tool in axial alignment with the nut during a nut cutting operation, said locking mechanism having a threaded connection with said driver, whereby when said locking mechanism is locked onto the externally threaded member and said driver is rotated, said threaded connection will cause said driver and said cutter head to move axially relative to said locking mechanism to provide a mechanical advantage during the nut cutting operation, said locking mechanism having a socket accessible through an inboard end of said driver for engagement by a wrench extension for rotating said locking mechanism relative to said driver.

37. A nut cutter tool comprising a cutter head, a rotatable driver drivingly connected to said cutter head, and a chip guard on said tool for catching falling chips during cutting of a nut threaded onto an externally threaded member extending downwardly below a support member, said chip guard being spring loaded by a spring urging said chip guard in a direction axially outwardly relative to said cutter head and said driver so that cutter blades on said cutter head are not exposed when said tool is not in use, and said chip guard having a continuous outer lip that is maintained by the spring in full contact with the support member completely surrounding the nut during the nut cutting operation to provide a completely enclosed reservoir surrounding the nut for collecting all of the chips that are produced during the nut cutting operation.

* * * * *